United States Patent
Kawamura

[11] Patent Number: 5,805,352
[45] Date of Patent: Sep. 8, 1998

[54] ZOOM LENS SYSTEM HAVING TWO LENS UNITS

[75] Inventor: Kazuteru Kawamura, Hino, Japan

[73] Assignee: Olympus Optical Co., Ltd., Tokyo, Japan

[21] Appl. No.: 861,224

[22] Filed: May 21, 1997

Related U.S. Application Data

[63] Continuation of Ser. No. 186,338, Jan. 25, 1994, abandoned.

[30] Foreign Application Priority Data

Jan. 26, 1993 [JP] Japan .................................. 5-010754

[51] Int. Cl.⁶ .............................. G02B 15/14; G02B 3/02
[52] U.S. Cl. .......................... 359/692; 359/716; 359/717
[58] Field of Search ................................ 359/692, 690, 359/689, 688, 687, 713–716

[56] References Cited

U.S. PATENT DOCUMENTS

| | | | |
|---|---|---|---|
| 2,997,919 | 8/1961 | Peck | 359/692 |
| 3,594,066 | 7/1971 | Cook et al. | 359/688 |
| 4,836,662 | 6/1989 | Ogata et al. | 359/690 |
| 4,842,386 | 6/1989 | Kitoyishi et al. | 359/690 |
| 5,204,779 | 4/1993 | Nakata et al. | 359/688 |
| 5,216,547 | 6/1993 | Ogata | 359/689 |
| 5,257,135 | 10/1993 | Kohno et al. | 359/690 |
| 5,315,440 | 5/1994 | Betensky | 359/692 |
| 5,327,290 | 7/1994 | Fukushima et al. | 359/692 |
| 5,353,159 | 10/1994 | Morooka | 359/689 |
| 5,353,162 | 10/1994 | Ito et al. | 359/692 |
| 5,363,243 | 11/1994 | Takayuki et al. | 359/689 |
| 5,386,321 | 1/1995 | Kawamura | 359/692 |

FOREIGN PATENT DOCUMENTS

| | | |
|---|---|---|
| 3158814 | 7/1991 | Japan . |
| 3175410 | 7/1991 | Japan . |
| 5-281471 | 10/1993 | Japan ...................................... 359/692 |

OTHER PUBLICATIONS

Meiron, "On the Design of Optical Systems Containing Asphoric Surfaces", S. of Opt. Soc. of Amm. vol. 46, No. 4 Apr. 1956.

*Primary Examiner*—David C. Nelms
*Assistant Examiner*—Jordan M. Schwartz
*Attorney, Agent, or Firm*—Cushman Darby & Cushman IP Group of Pillsbury; Madison & Sutro LLP

[57] ABSTRACT

A zoom lens system having two, positive and negative, lens units, which is designed so that the number of constituent lenses is minimized to lower the cost and reduce the size, and yet high performance is realized, and that deterioration of the performance caused when the lenses are incorporated into a lens frame is minimized, and assembling is also facilitated. The zoom lens system has a 1-st lens unit (G1) of positive power and a 2-nd lens unit (G2) of negative power and is adapted to effect zooming by varying the spacing between the 1-st and 2-nd lens units (G1 and G2). The 1-st lens unit (G1) includes a single cemented lens ($L_{12}$) composed of a negative lens ($L_1$) and a positive lens ($L_2$). The 1-st lens unit (G1) has at least one aspherical lens surface and satisfies the condition of $v_P - v_N > 15$, where $v_N$ is the Abbe's number of the negative lens ($L_1$), and $v_P$ is the Abbe's number of the positive lens ($L_2$).

14 Claims, 11 Drawing Sheets

(Wide end)

(Standard position)

(Tele end)

(Wide end)

(Standard position)

(Tele end)

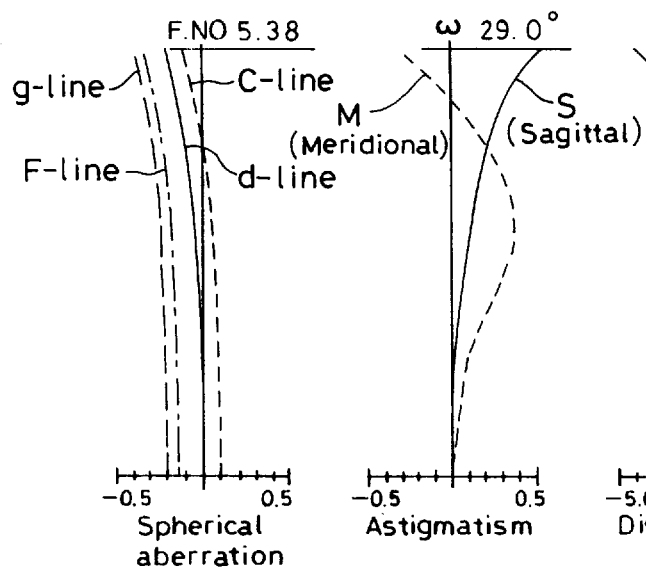
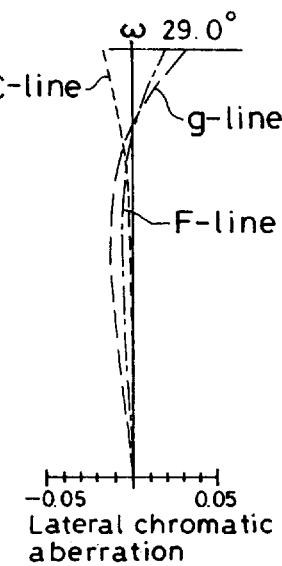
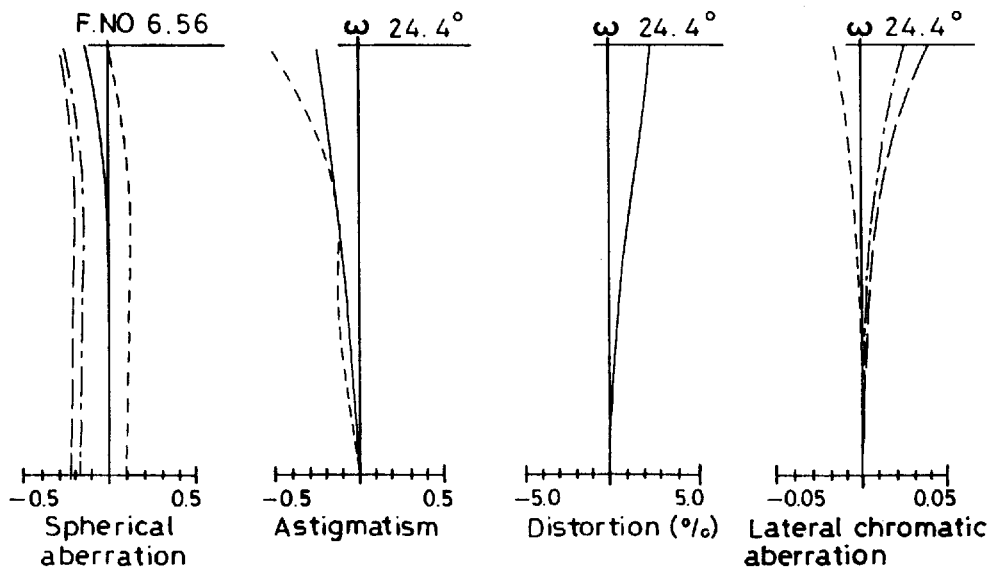

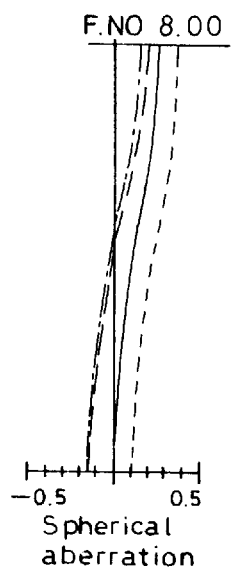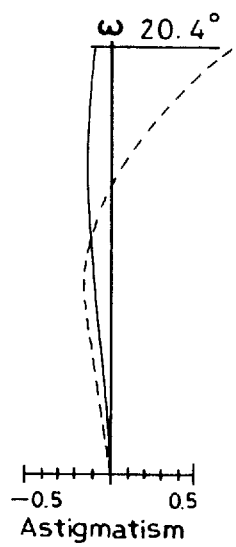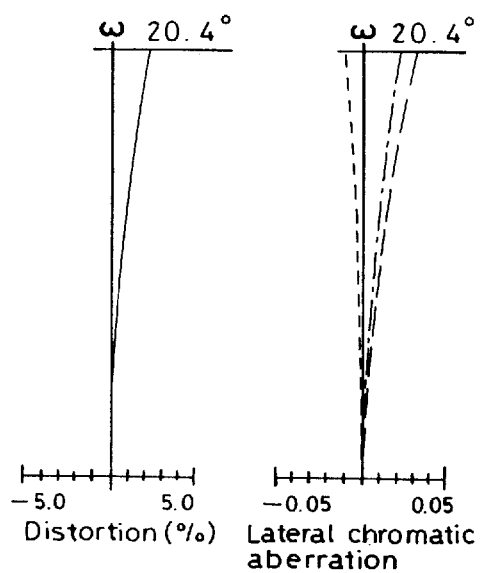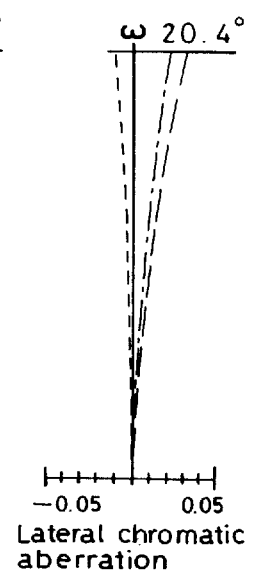
FIG. 4I  FIG. 4J  FIG. 4K  FIG. 4L
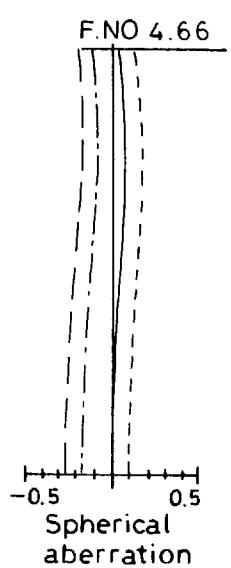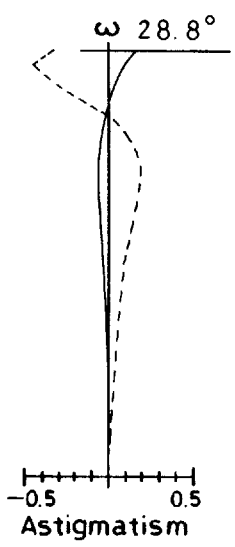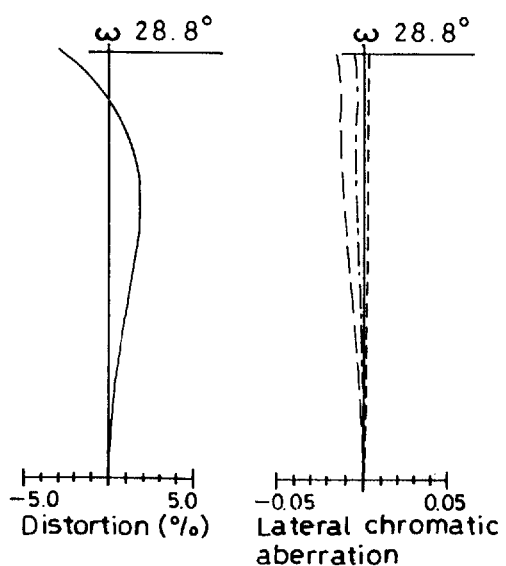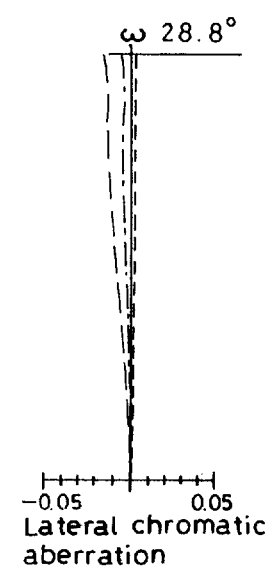
FIG. 5A  FIG. 5B  FIG. 5C  FIG. 5D FIG.5E  FIG.5F  FIG.5G  FIG.5H
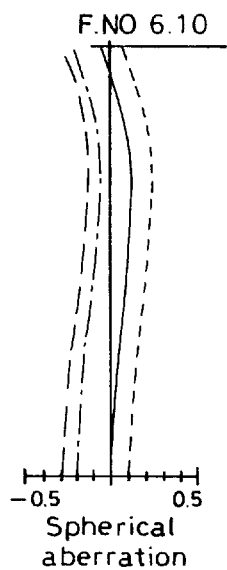
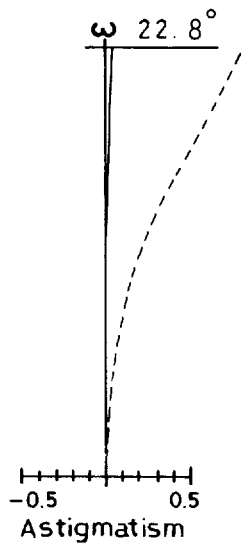
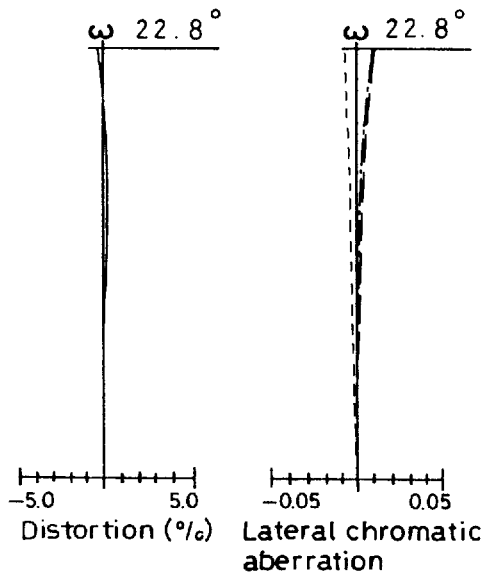
FIG.5I  FIG.5J  FIG.5K  FIG.5L
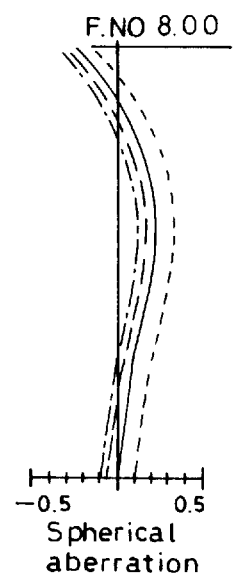
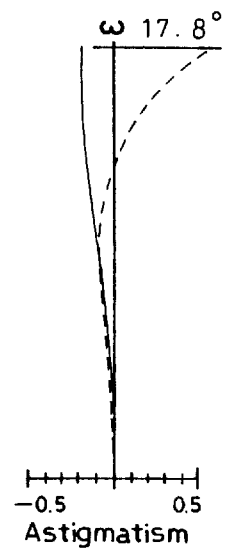
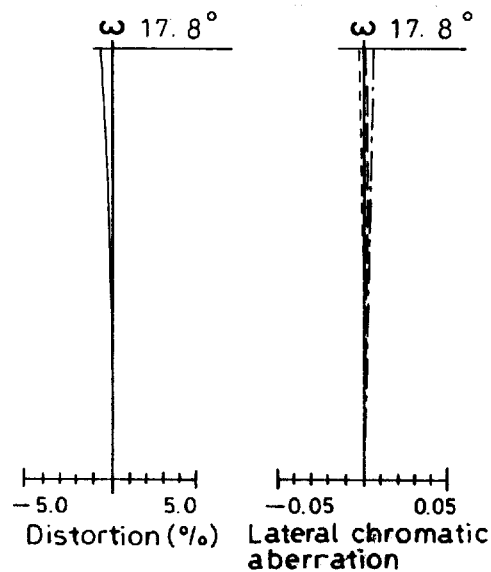

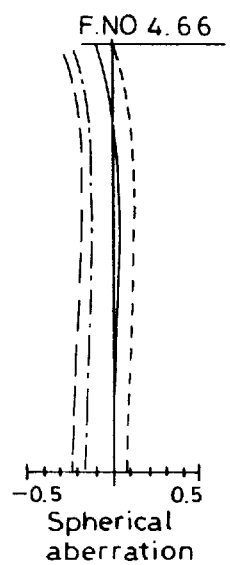
FIG. 6A
F.NO 4.66
-0.5  0.5
Spherical aberration
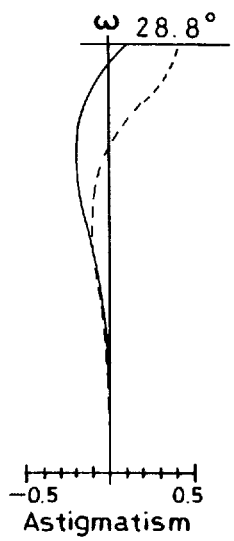
FIG. 6B
ω 28.8°
-0.5  0.5
Astigmatism
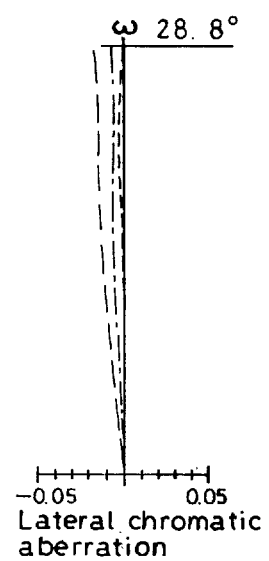
FIG. 6C
ω 28.8°
-5.0  5.0
Distortion (%)
FIG. 6D
ω 28.8°
-0.05  0.05
Lateral chromatic aberration
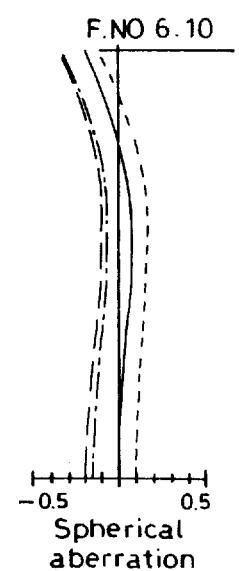
FIG. 6E
F.NO 6.10
-0.5  0.5
Spherical aberration
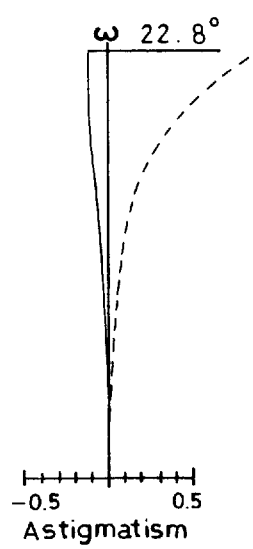
FIG. 6F
ω 22.8°
-0.5  0.5
Astigmatism
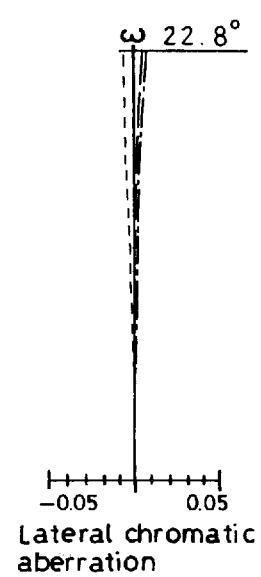
FIG. 6G
ω 22.8°
-5.0  5.0
Distortion (%)
FIG. 6H
ω 22.8°
-0.05  0.05
Lateral chromatic aberration FIG. 6I  FIG. 6J  FIG. 6K  FIG. 6L
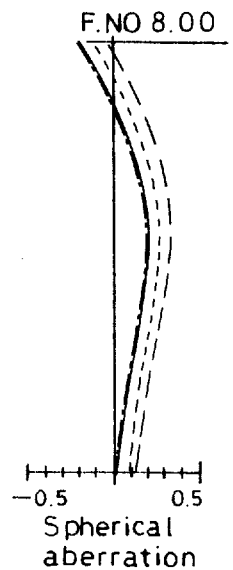
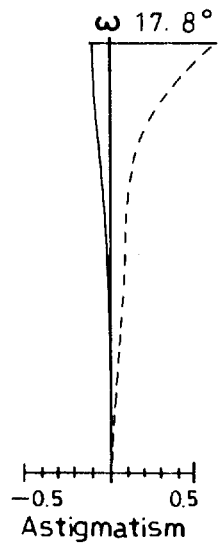
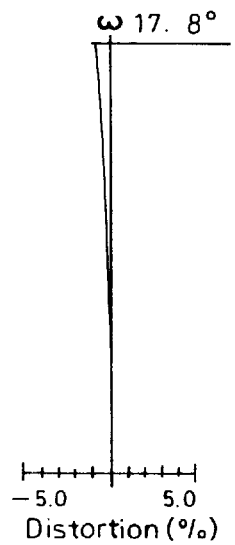
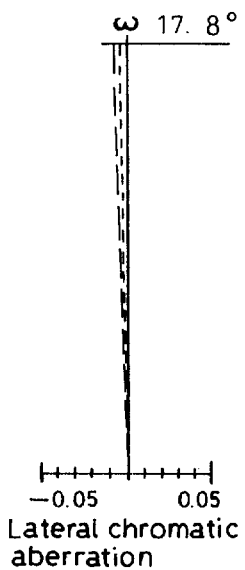
FIG. 7A  FIG. 7B  FIG. 7C  FIG. 7D
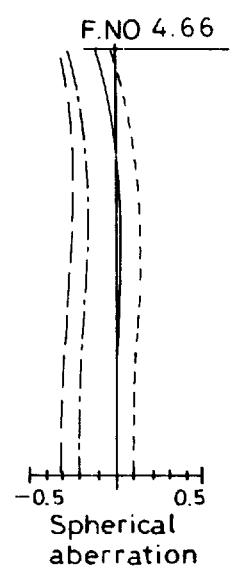
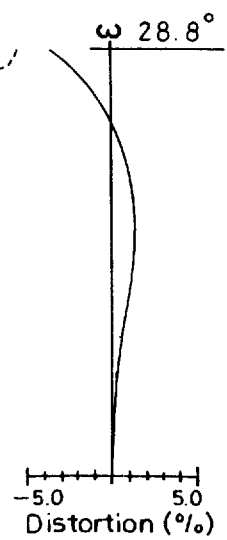
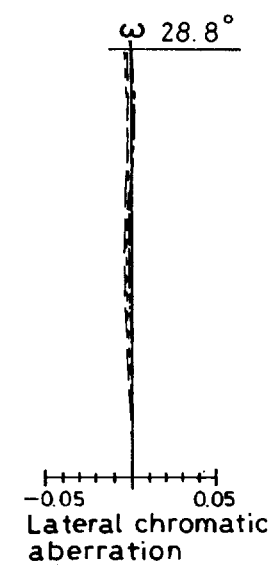

FIG. 7E
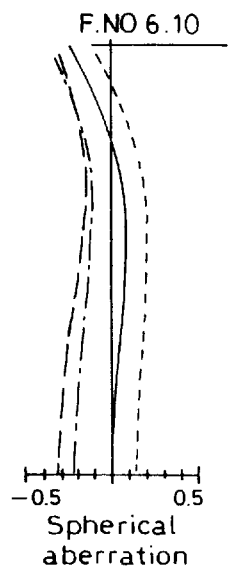
Spherical aberration
FIG. 7F
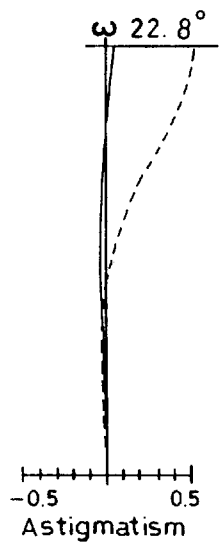
Astigmatism
FIG. 7G
Distortion (%)
FIG. 7H
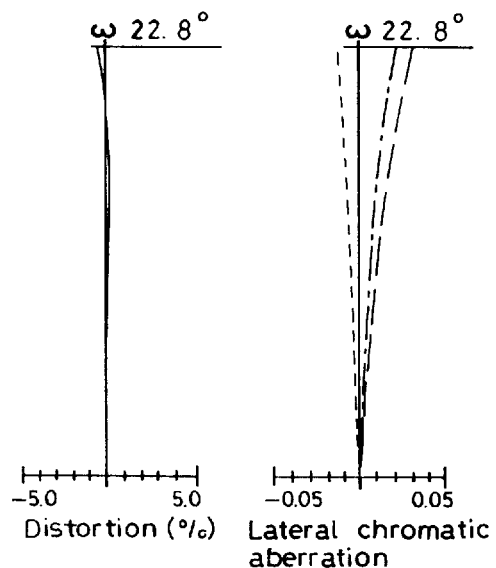
Lateral chromatic aberration
FIG. 7I
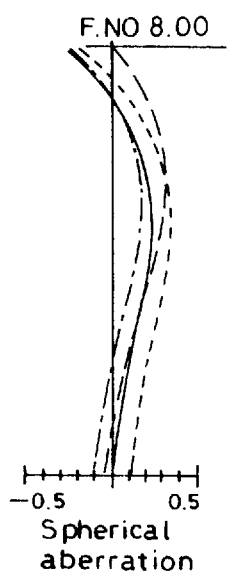
Spherical aberration
FIG. 7J
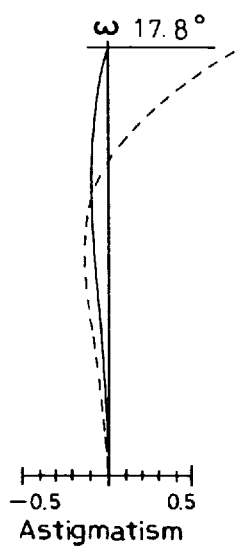
Astigmatism
FIG. 7K
Distortion (%)
FIG. 7L
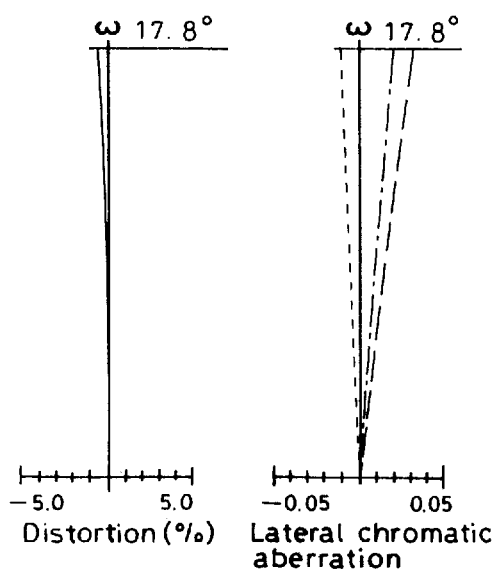
Lateral chromatic aberration FIG. 8A  FIG. 8B  FIG. 8C  FIG. 8D
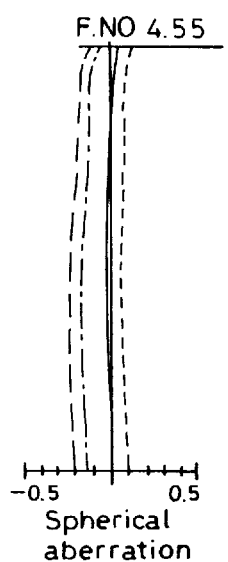 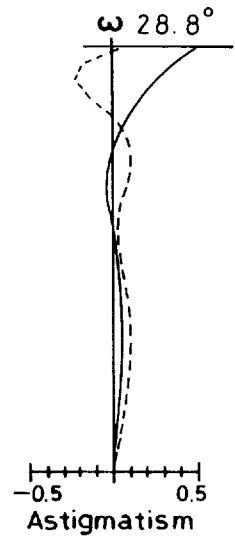 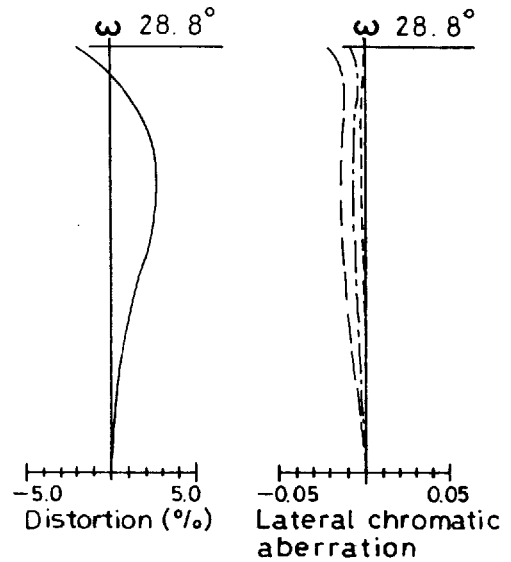
FIG. 8E  FIG. 8F  FIG. 8G  FIG. 8H
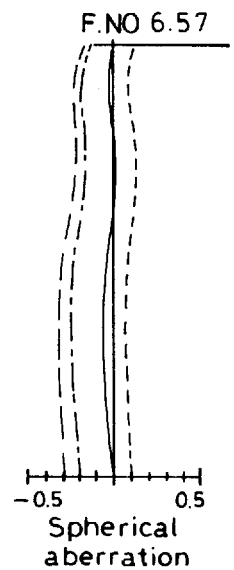 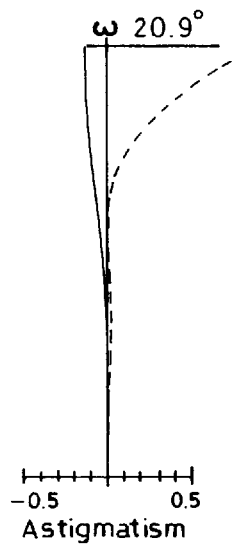 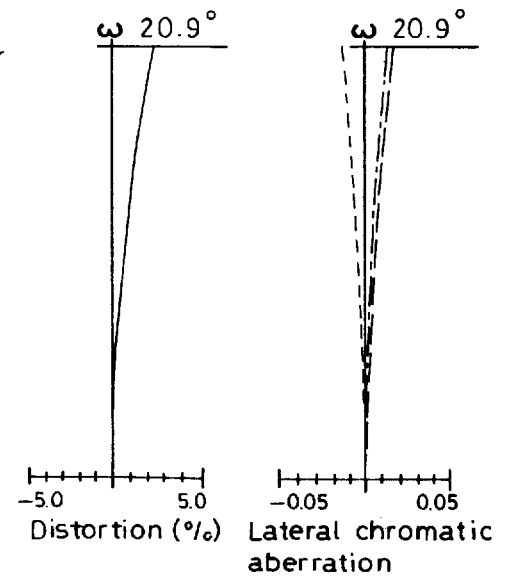

FIG. 8I   FIG. 8J   FIG. 8K   FIG. 8L
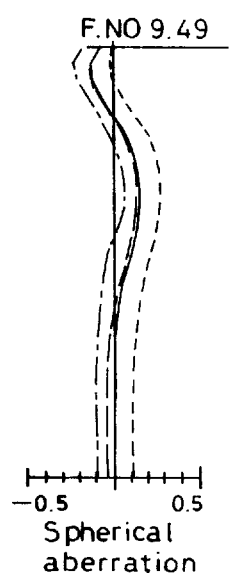
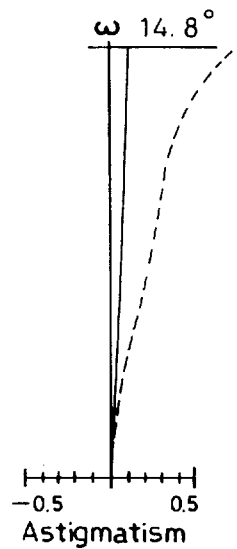
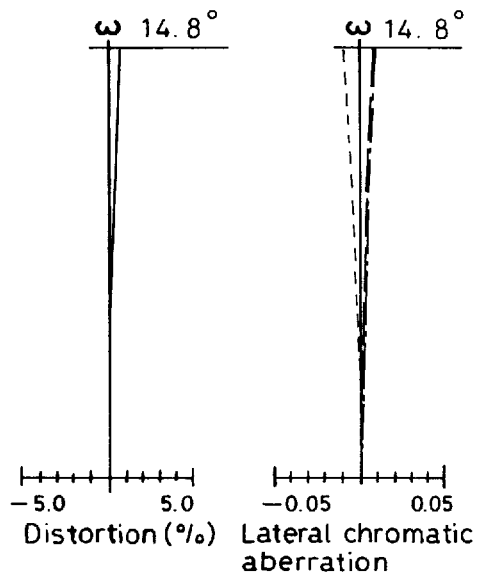
F.NO 9.49   ω 14.8°   ω 14.8°   ω 14.8°
−0.5   0.5   −0.5   0.5   −5.0   5.0   −0.05   0.05
Spherical aberration   Astigmatism   Distortion (%)   Lateral chromatic aberration

ZOOM LENS SYSTEM HAVING TWO LENS UNITS

This is a continuation of application Ser. No. 08/186,338, filed on Jan. 25, 1994, which was abandoned upon the filing hereof.

BACKGROUND OF THE INVENTION

The present invention relates to a zoom lens system having a relatively small number of lens elements. More particularly, the present invention relates to a zoom lens system having two lens units which is suitable for use with a compact camera or the like.

Recently, compact cameras have actively been improved to achieve a lowering in cost and a reduction in size. Consequently, taking lenses for use with compact cameras have also been demanded to be reduced in cost and size. An effective way of realizing a zoom lens system of low cost and small size is, needless to say, to minimize the number of constituent lens elements. In addition, a reduction in the number of lens units makes it possible to simplify the lens frame structure and minimize the deterioration of performance due to decentering between the lens units and hence enables stable performance to be obtained relatively easily at a reduced cost.

In this sense, an effective way of realizing a zoom lens system of low cost and small size is to reduce the number of lens elements in a lens arrangement having two lens units, which is the smallest number of lens units with which a zoom lens system can be constructed.

To reduce the size of a zoom lens system by minimizing the number of lens elements, the power of the constituent lens elements must be increased, and use of an aspherical surface is indispensable for obtaining favorable performance. Japanese Patent Application Laid-Open (KOKAI) Nos. 03-175410 (1991) and 03-158814 (1991) disclose zoom lens systems that meet the above-described requirements. These zoom lens systems have two lens units, that is, a positive lens unit and a negative lens unit. The 1-st lens unit is composed of two lens elements, that is, negative and positive lenses, and has an aspherical surface. The 2-nd lens unit is composed of one or two lens elements.

When it is intended to reduce the number of lens elements in a zoom lens system including two, positive and negative, lens units and having a zoom ratio of 1.5 or higher, it may be considered that a lens arrangement composed of the smallest number of lens elements can be realized by forming the 1-st lens unit practically from two lens elements. The reason for this is as follows: Since chromatic aberration generated in the 1-st lens unit is increased by the power of the 2-nd lens unit, it cannot be kept within an allowable chromatic aberration range unless the chromatic aberration is corrected in the 1-st lens unit. Accordingly, the 1-st lens unit needs at least one negative lens and one positive lens.

It is also necessary in order to obtain excellent aberration correction conditions over the entire zooming range to correct principal aberrations such as spherical aberration, coma, astigmatism, etc. in the 1-st lens unit. If the 1-st lens unit is composed of two, negative and positive, lenses as in the zoom lens systems of Japanese Patent Application Laid-Open (KOKAI) Nos. 03-175410 (1991) and 03-158814 (1991), it becomes indispensable to combine together lenses of high power and an aspherical surface as described above, and aberration correction is made with this combination. In this case, however, the amount of aberration generated in each lens becomes exceedingly large. Therefore, it may be said that the performance deteriorates to a considerable extent due to decentering and variation in the spacing between the two lenses constituting the 1-st lens unit.

Accordingly, when constituent lenses are incorporated into a lens frame, great care must be taken of decentering and variation in the spacing between the lenses. Thus, the conventional zoom lens system suffers from the problem that it is exceedingly difficult to incorporate lenses into a lens frame, although the number of constituent lenses is small.

SUMMARY OF THE INVENTION

In view of the above-described problems, it is an object of the present invention to provide a zoom lens system having two, positive and negative, lens units, which is designed so that the number of constituent lenses is minimized to lower the cost and reduce the size, and yet high performance is realized, and that deterioration of the performance caused when the lenses are incorporated into a lens frame is minimized, and assembly is facilitated.

To attain the above-described object, the present invention provides a two-unit zoom lens system which is a variable focus lens system including, in order from the object side, a 1-st lens unit of positive power, and a 2-nd lens unit of negative power, and in which the focal length of the entire system is varied by changing the spacing between the two lens units. The 1-st lens unit includes a cemented doublet which is composed of two lens elements, that is, a negative lens and a positive lens, and at least one lens surface of this cemented lens is aspherical.

In this case, it is preferable to satisfy the following condition:

$$v_P - v_N > 15 \quad (1)$$

where $v_N$ is the Abbe's number of the negative lens in the 1-st lens unit, and $v_P$ is the Abbe's number of the positive lens in the 1-st lens unit.

It is also preferable to arrange the 1-st lens unit so that the negative lens is disposed on the object side, and the positive lens is disposed on the image side.

In addition, it is preferable to satisfy the following condition for any focal length position of the lens system:

$$0.8 < d_{12} F_{NO}/f_0 < 3.0 \quad (2)$$

where $d_{12}$ is the thickness of the cemented lens in the 1-st lens unit; $f_0$ is the focal length of the entire system; and $F_{NO}$ is the F-number of the lens system at the focal length $f_0$.

Further, the cemented lens in the 1-st lens unit preferably has a convex surface directed toward the image side.

The aspherical surface provided on the cemented lens in the 1-st lens unit is preferably shaped so that the positive refractive power becomes weaker or the negative refractive power becomes stronger as the distance from the center of the lens surface increases toward the periphery thereof.

Furthermore, the 2-nd lens unit may include an aspherical surface.

In addition, the present invention includes a variable focus lens system having, in order from the object side, a 1-st lens unit including a cemented lens of positive power, and a 2-nd lens unit including a negative single lens, in which the focal length of the entire system is varied by changing the spacing between the two lens units.

In addition, the present invention includes a variable focus lens system having, in order from the object side, a 1-st lens unit including a cemented lens of positive power, and a 2-nd lens unit of negative power which includes a positive lens and a negative meniscus lens having a convex surface directed toward the image side, in which the focal length of the entire system is varied by changing the spacing between the two lens units.

In these variable focus lens systems, an aperture stop is preferably disposed between the 1-st and 2-nd lens units.

The cemented lens in the 1-st lens unit may have either a meniscus configuration with a convex surface directed toward the image side or a double convex configuration.

Further, the 1-st and 2-nd lens units may each include an aspherical surface. It is also possible for each of the 1-st and 2-nd lens units to include a plurality of aspherical surfaces.

In addition, the present invention includes a variable focus lens system having, in order from the object side, a 1-st lens unit including a doublet which is composed of negative and positive lens elements, and a 2-nd lens unit having negative power, in which the focal length of the entire system is varied by moving both the 1-st and 2-nd lens units along the optical axis.

The reason for adopting the above-described arrangements and the functions thereof will be explained below.

In the present invention, the 1-st lens unit G1 in a zoom lens system having two, positive and negative, lens units is formed from a cemented lens $L_{12}$ composed of two lens elements, that is, negative and positive lenses. The cemented lens $L_{12}$ has at least one aspherical surface, thereby effectively correcting spherical aberration, coma and astigmatism.

The 1-st lens unit G1 satisfies the following condition:

$$v_P - v_N > 15 \quad (1)$$

where $v_N$ is the Abbe's number of the negative lens in the 1-st lens unit G1, and $v_P$ is the Abbe's number of the positive lens in the 1-st lens unit G1.

The condition (1) must be satisfied to correct chromatic aberration. Axial and lateral chromatic aberrations can be effectively corrected by satisfying the condition (1).

By virtue of the above-described arrangement, although the 1-st lens unit G1 is formed from a single cemented doublet $L_{12}$, aberration that is generated in the 1-st lens unit G1 can effectively be corrected, and a zoom lens system of favorable performance can be constructed.

Further, the 1-st lens unit G1 is practically composed of two lens elements, which is the smallest number of constituent lens elements, as described above. Accordingly, it is possible to achieve a reduction in size and a lowering in cost. Since the 1-st lens unit G1 includes only one cemented doubled $L_{12}$, the amount of decentration and variation of the lens spacing can be made much smaller than in a case where two discrete lens elements are incorporated into a lens frame. Thus, assembleability improves to a considerable extent.

The cemented doublet $L_{12}$ preferably has a strong convex surface directed toward the image side. With such a configuration, aberration correction is effectively made, and at the same time, the principal point is brought closer to the 2-nd lens unit G2, thereby providing a satisfactorily long zooming space to enable a smooth zooming operation. From the viewpoint of the configuration, the cemented doublet $L_{12}$ preferably has negative and positive lens elements disposed in the mentioned order from the object side. By doing so, the curvature of the cemented lens can be made moderate from the viewpoint of the lens arrangement, and axial and lateral chromatic aberrations can be smoothly corrected.

In addition, it is preferable to satisfy the following condition for any focal length position of the lens system:

$$0.8 < d_{12} F_{NO}/f_0 < 3.0 \quad (2)$$

where $d_{12}$ is the thickness of the cemented doublet $L_{12}$; $f_0$ is the focal length of the entire system; and $F_{NO}$ is the F-number of the lens system at the focal length $f_0$.

If $d_{12} F_{NO}/f_0$ is not larger than the lower limit of the condition (2), i.e., 0.8, the amount of spherical and comatic aberrations increases, making it impossible to correct aberrations satisfactorily. On the other hand, if $d_{12} F_{NO}/f_0$ is not smaller than the upper limit of the condition (2), i.e., 3.0, the overall length becomes excessively long, and the lens diameter becomes excessively large, so that it is impossible to achieve a reduction in the size of the lens system, which is the object of this application.

With a view to effectively correcting aberrations, the aspherical surface used in the cemented doublet $L_{12}$ is preferably shaped so that the positive refractive power becomes weaker or the negative refractive power becomes stronger as the distance from the center of the lens surface increases toward the periphery thereof.

In addition, it is preferable that the 2-nd lens unit G2 should be comprised of either a single negative lens $L_3'$ or a combination of a positive or negative meniscus lens $L_3$ having a convex surface directed toward the image side and a negative meniscus lens $L_4$ having a convex surface directed toward the image side and should have at least one aspherical lens surface.

Thus, the 2-nd lens unit G2 can effectively correct variation of aberrations, mainly distortion and astigmatism, with a relatively small number of lens elements, that is, one or two.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 4A–4L graphically show spherical aberration, astigmatism, distortion and lateral chromatic aberration at the wide end (FIGS. 4A–4D), the standard position (FIGS. 4C–4H), and the tele end (FIGS. 4I–4L) in Example 1.

FIGS. 5A–5L graphically show various aberrations in Example 2 in a similar manner to FIG. 4.

FIGS. 6A–6L graphically show various aberrations in Example 3 in a similar manner to FIG. 4.

FIGS. 7A–7L graphically show various aberrations in Example 4 in a similar manner to FIG. 4.

FIGS. 8A–8L graphically show various aberrations in Example 5 in a similar manner to FIG. 4.

DESCRIPTION OF THE PREFERRED EMBODIMENTS

Examples 1 to 5 of the two-unit zoom lens system according to the present invention will be described below.

Figure 1A:
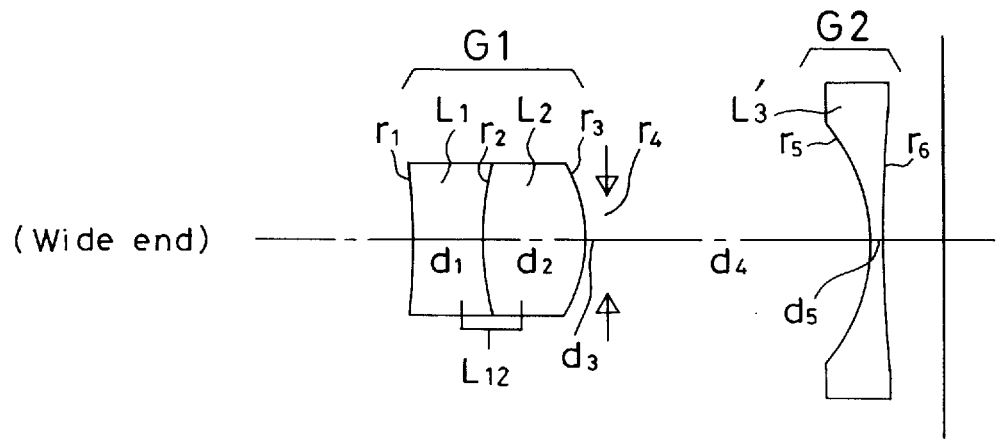
FIGS. 1A–1C are sectional views showing Example 1 of the two-unit zoom lens system according to the present invention in three different positions, that is, the wide end, the standard position, and the tele end respectively.
Figure 1B:
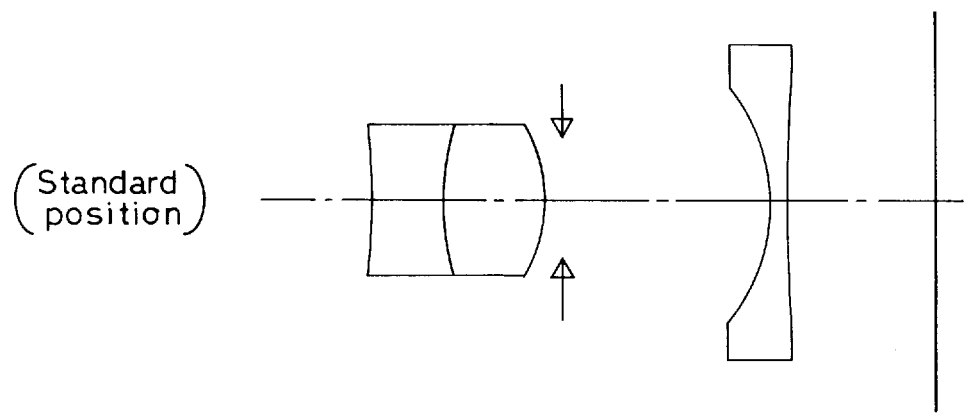
Figure 1C:
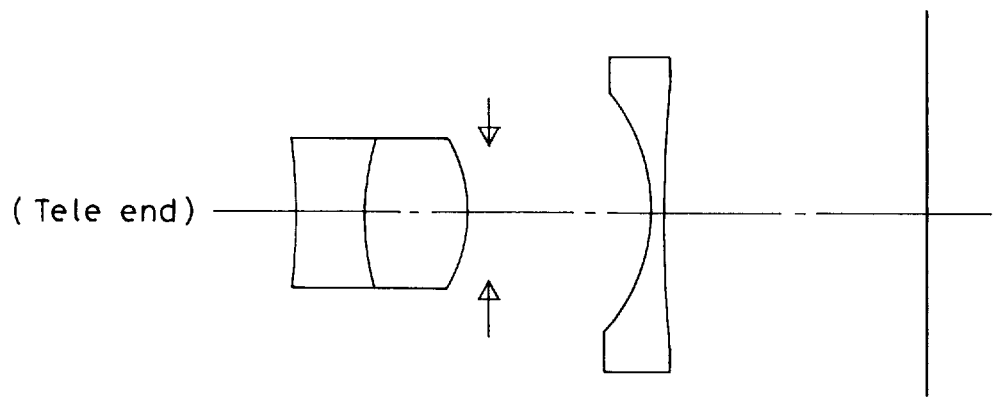
Figure 2A:
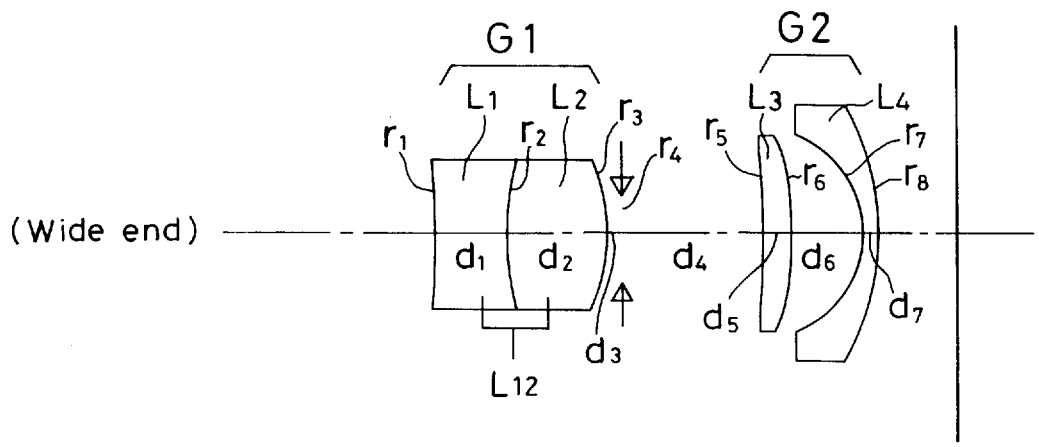
FIGS. 2A–2C are a sectional views showing Example 2 of the two-unit zoom lens system according to the present invention in a similar manner to FIG. 1.
Figure 2B:
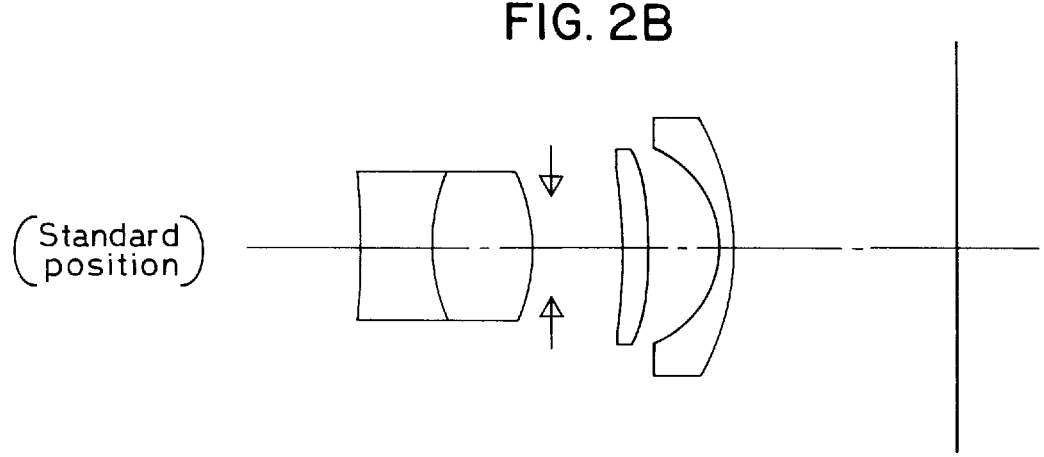
Figure 2C:
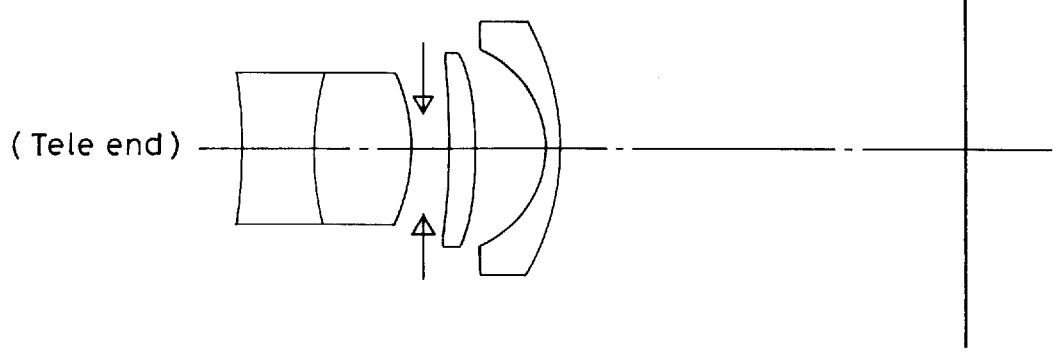
Figure 3A:
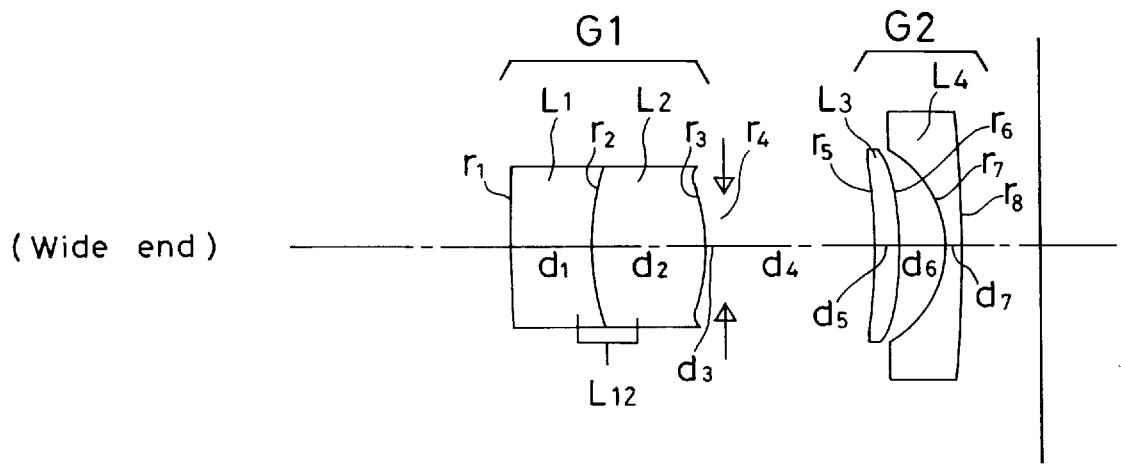
FIGS. 3A–3C are sectional views showing Example 5 of the two-unit zoom lens system according to the present invention in a similar manner to FIG. 1.
Figure 3B:
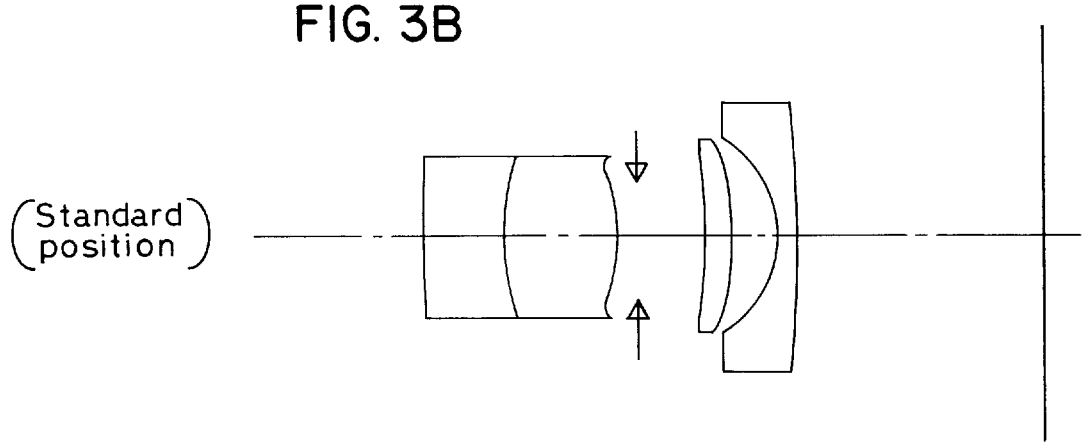
Figure 3C:
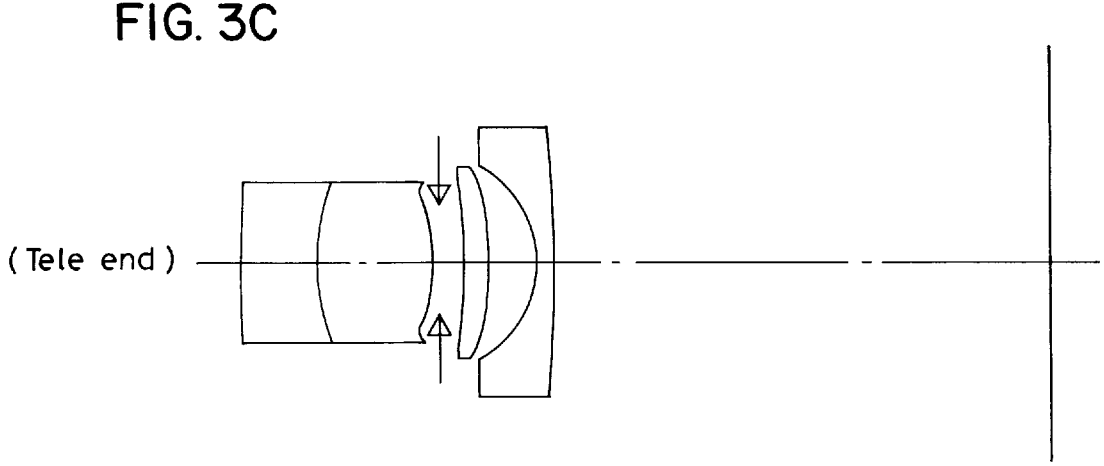

Lens data in each Example will be described later. FIGS. 1, 2 and 3 are sectional views respectively showing Examples 1, 2 and 5 of the present invention in three different positions, that is, the wide end, the standard position, and the tele end. Since the lens arrangements of Examples 3 and 4 are similar to the arrangement of Example 2, illustration thereof is omitted.

In any of the Examples, the 1-st lens unit G1 has positive power, and the 2-nd lens unit G2 has negative power. In zooming from the wide end toward the tele end, the 1-st and 2-nd lens units G1 and G2 move toward the object side while reducing the spacing $d_4$ therebetween. In Examples 1 to 4, the 1-st lens unit G1 includes a cemented lens $L_{12}$ composed of a double concave lens $L_1$ and a double convex lens $L_2$. In Example 5, the 1-st lens unit G1 includes a cemented doublet $L_{12}$ composed of a negative meniscus lens $L_1$ having a convex surface directed toward the object side, and a double convex lens $L_2$. In Example 1, the 2-nd lens unit G2 includes a single double concave lens $L_3'$. In Examples 2 and 5, the 2-nd lens unit G2 includes two lens elements, that is, a positive meniscus lens $L_3$ having a convex surface directed toward the image side, and a negative meniscus lens $L_4$ having a convex surface directed toward the image side. In Examples 3 and 4, the 2-nd lens unit G2 includes two lens elements, that is, a negative meniscus lens $L_3$ having a convex surface directed toward the image side, and a negative meniscus lens $L_4$ having a convex surface directed toward the image side.

Regarding aspherical surfaces, Example 1 uses two aspherical surfaces, that is, one for the front surface of the negative lens $L_1$ in the 1-st lens unit G1, and the other for the front surface of the double concave lens $L_3'$ in the 2-nd lens unit G2. In Examples 2 to 4, three aspherical surfaces are used: one for the front surface of the negative lens $L_1$ in the 1-st lens unit G1, and the other two for both surfaces of the object-side meniscus lens $L_3$ in the 2-nd lens unit G2. In Example 5, four aspherical surfaces are used: one for the front surface of the negative lens $L_1$ in the 1-st lens unit G1; another for the rear surface of the positive lens $L_2$ in the 1-st lens unit G1; and the other two for both surfaces of the object-side meniscus lens $L_3$ in the 2-nd lens unit G2.

Lens data in each Example will be shown below. In the following, reference symbol f denotes the focal length, $F_{NO}$ is F-number, $2\omega$ is the half view angle, $f_B$ is the back focus, $r_1, r_2 \ldots$ are the curvature radii of lens surfaces, $d_1, d_2 \ldots$ are the spacings between adjacent lens surfaces, $n_{d1}, n_{d2} \ldots$ are the refractive indices of the lenses for the spectral d-line, and $\nu_{d1}, \nu_{d2} \ldots$ are the Abbe's numbers of the lenses. Assuming that the direction of the optical axis is x and a direction perpendicular to the optical axis is y, the aspherical configuration is expressed by $$x=(y^2/r)/[1+\{1-P(y^2/r^2)\}^{1/2}]+A_4y^4+A_6y^6+A_8y^8+A_{10}y^{10}$$

where r is the paraxial curvature radius; P is a conical coefficient; and $A_4$, $A_6$, $A_8$, and $A_{10}$ are aspherical coefficients.

EXAMPLE 1

$f = 39.14 \sim 47.73 \sim 58.20$
$F_{NO} = 5.4 \sim 6.6 \sim 8.0$
$2\omega = 57.9° \sim 48.8° \sim 40.8°$
$f_B = 5.76 \sim 15.15 \sim 26.99$

| | | | | | | | | |
|---|---|---|---|---|---|---|---|---|
| $r_1 =$ | −160.4978 | $d_1 =$ | 7.3605 | $n_{d1} =$ | −1.59270 | $\nu_{d1} =$ | 35.29 |
| | (Aspheric) | $d_2 =$ | 10.7676 | $n_{d2} =$ | 1.55232 | $\nu_{d2} =$ | 63.75 |
| $r_2 =$ | 27.3798 | $d_3 =$ | 1.000 | | | | |
| $r_3 =$ | −16.3842 | $d_4 =$ | (Variable) | | | | |
| $r_4 =$ | ∞ (Stop) | $d_5 =$ | 1.5000 | $n_{d3} =$ | 1.51633 | $\nu_{d4} =$ | 64.15 |
| $r_5 =$ | −19.1142 | | | | | | |
| | (Aspheric) | | | | | | |
| $r_6 =$ | 750.8655 | | | | | | |

-continued

Zooming Spaces f   39.14   47.73   58.20
d   28.057  22.585  18.099
Aspherical Coefficients 1st surface $P =$ 5.4896
$A_4 =$ −0.60904 × $10^{-4}$
$A_6 =$ −0.21606 × $10^{-6}$
$A_8 =$ 0.50236 × $10^{-8}$
$A_{10} =$ −0.81504 × $10^{-10}$
5th surface $P =$ 0.1628
$A_4 =$ −0.18250 × $10^{-4}$
$A_6 =$ −0.82795 × $10^{-7}$
$A_8 =$ 0.10415 × $10^{-8}$
$A_{10} =$ −0.10295 × $10^{-11}$
(1) $\nu_P - \nu_N =$ 28.46
(2) $d_{12}F_{NO}/f_0 =$ 2.49

EXAMPLE 2

$f = 39.33 \sim 51.54 \sim 67.55$
$F_{NO} = 4.7 \sim 6.1 \sim 8.0$
$2\omega = 57.6° \sim 45.5° \sim 35.5°$
$f_B = 7.88 \sim 22.36 \sim 41.36$

| | | | | | | | | |
|---|---|---|---|---|---|---|---|---|
| $r_1 =$ | −423.1334 | $d_1 =$ | 7.5000 | $n_{d1} =$ | 1.62004 | $\nu_{d1} =$ | 36.25 |
| | (Aspheric) | $d_2 =$ | 10.5774 | $n_{d2} =$ | 1.60311 | $\nu_{d2} =$ | 60.70 |
| $r_2 =$ | 22.7144 | $d_3 =$ | 1.0000 | | | | |
| $r_3 =$ | −18.0066 | $d_4 =$ | (Variable) | | | | |
| $r_4 =$ | ∞ (Stop) | $d_5 =$ | 2.7000 | $n_{d3} =$ | −1.53172 | $\nu_{d3} =$ | 48.90 |
| $r_5 =$ | −93.9148 | $d_6 =$ | 7.5731 | | | | |
| | (Aspheric) | $d_7 =$ | 1.5000 | $n_{d4} =$ | 1.51633 | $\nu_{d4} =$ | −64.15 |
| $r_6 =$ | −75.7413 | | | | | | |
| | (Aspheric) | | | | | | |
| $r_7 =$ | −10.5521 | | | | | | |
| $r_8 =$ | −26.3547 | | | | | | |

Zooming Spaces f   39.33   51.54   67.55
d   14.746  7.768   2.437
Aspherical Coefficients 1st surface $P =$ −10.9397
$A_4 =$ −0.57371 × $10^{-4}$
$A_6 =$ −0.69074 × $10^{-7}$
$A_8 =$ 0.21695 × $10^{-9}$
$A_{10} =$ −0.11934 × $10^{-10}$
5th surface $P =$ −2.9999
$A_4 =$ 0.48459 × $10^{-4}$
$A_6 =$ 0.11679 × $10^{-5}$
$A_8 =$ −0.33553 × $10^{-7}$
$A_{10} =$ 0.18999 × $10^{-9}$
6th surface $P =$ 1.0000
$A_4 =$ 0.45164 × $10^{-5}$
$A_6 =$ 0.48259 × $10^{-6}$
$A_8 =$ −0.15885 × $10^{-7}$
$A_{10} =$ 0.24674 × $10^{-10}$
(1) $\nu_P - \nu_N =$ 24.45
(2) $d_{12}F_{NO}/f_0 =$ 2.14

EXAMPLE 3

$f = 39.33 \sim 51.54 \sim 67.55$
$F_{NO} = 4.7 \sim 6.1 \sim 8.0$
$2\omega = 57.6° \sim 45.5° \sim 35.5°$
$F_B = 6.83 \sim 21.40 \sim 40.50$

| | | | | | | | |
|---|---|---|---|---|---|---|---|
| $r_1 =$ | −565.0367 | $d_1 =$ | 8.1924 | $n_{d1} =$ | 1.59270 | $v_{d1} =$ | 35.29 |
| | (Aspheric) | $d_2 =$ | 11.1872 | $n_{d2} =$ | 1.62041 | $v_{d2} =$ | 60.27 |
| $r_2 =$ | 22.4109 | $d_3 =$ | 1.0000 | | | | |
| $r_3 =$ | −19.5995 | $d_4 =$ | (Variable) | | | | |
| $r_4 =$ | ∞ (Stop) | $d_5 =$ | 3.5000 | $n_{d3} =$ | 1.51742 | $v_{d3} =$ | 52.41 |
| $r_5 =$ | −71.5713 | $d_6 =$ | 7.6656 | | | | |
| | (Aspheric) | $d_7 =$ | 1.5000 | $n_{d4} =$ | 1.51633 | $v_{d4} =$ | 64.15 |
| $r_6 =$ | −87.4041 | | | | | | |
| | (Aspheric) | | | | | | |
| $r_7 =$ | −11.0211 | | | | | | |
| $r_8 =$ | −24.6833 | | | | | | |

Zooming Spaces

| f | 39.33 | 51.54 | 67.55 |
|---|---|---|---|
| d | 14.833 | 7.804 | 2.437 |

Aspherical Coefficients

1st surface $P = -10.9366$
$A_4 = -0.50623 \times 10^{-4}$
$A_6 = 0.97574 \times 10^{-7}$
$A_8 = -0.29818 \times 10^{-8}$
$A_{10} = 0.78179 \times 10^{-11}$ 5th surface $P = -2.9999$
$A_4 = 0.35323 \times 10^{-4}$
$A_6 = 0.15044 \times 10^{-5}$
$A_8 = -0.46772 \times 10^{-7}$
$A_{10} = 0.33093 \times 10^{-9}$ 6th surface $P = 1.0000$
$A_4 = -0.51553 \times 10^{-5}$
$A_6 = 0.98693 \times 10^{-6}$
$A_8 = -0.25089 \times 10^{-7}$
$A_{10} = 0.10777 \times 10^{-9}$
(1) $v_P - v_N = 24.98$
(2) $d_{12} F_{NO}/f_0 = 2.30$

EXAMPLE 4

$f = 39.33 \sim 51.54 \sim 67.55$
$F_{NO} = 4.7 \sim 6.1 \sim 8.0$
$2\omega = 57.6° \sim 45.5° \sim 35.5°$
$F_B = 7.61 \sim 20.87 \sim 38.24$

| | | | | | | | |
|---|---|---|---|---|---|---|---|
| $r_1 =$ | −95.5160 | $d_1 =$ | 5.0000 | $n_{d1} =$ | 1.78472 | $v_{d1} =$ | 25.68 |
| | (Aspheric) | $d_2 =$ | 10.0000 | $n_{d2} =$ | 1.56873 | $v_{d2} =$ | 63.16 |
| $r_2 =$ | 161.8460 | $d_3 =$ | 1.0000 | | | | |
| $r_3 =$ | −14.5758 | $d_4 =$ | (Variable) | | | | |
| $r_4 =$ | ∞ (Stop) | $d_5 =$ | 2.7000 | $n_{d3} =$ | 1.52630 | $v_{d3} =$ | 51.17 |
| $r_5 =$ | −680.3170 | $d_6 =$ | 7.9101 | | | | |
| | (Aspheric) | $d_7 =$ | 1.5000 | $n_{d4} =$ | 1.58904 | $v_{d4} =$ | 53.20 |
| $r_6 =$ | −2733.4919 | | | | | | |
| | (Aspheric) | | | | | | |
| $r_7 =$ | −10.9962 | | | | | | |
| $r_8 =$ | −25.6110 | | | | | | |

Zooming Spaces

| f | 39.33 | 51.54 | 67.55 |
|---|---|---|---|
| d | 16.031 | 9.926 | 5.265 |

Aspherical Coefficients

1st surface $P = -10.9395$
$A_4 = -0.76436 \times 10^{-4}$
$A_6 = -0.14614 \times 10^{-6}$
$A_8 = -0.31177 \times 10^{-8}$
$A_{10} = -0.73097 \times 10^{-11}$ 5th surface $P = -3.4540$
$A_4 = 0.25352 \times 10^{-4}$
$A_6 = 0.11962 \times 10^{-5}$
$A_8 = -0.27426 \times 10^{-7}$
$A_{10} = 0.17817 \times 10^{-9}$ 6th surface $P = 1.0000$
$A_4 = -0.18393 \times 10^{-4}$
$A_6 = 0.81280 \times 10^{-6}$
$A_8 = -0.20663 \times 10^{-7}$
$A_{10} = 0.99767 \times 10^{-10}$
(1) $v_P - v_N = 37.48$
(2) $d_{12} F_{NO}/f_0 = 1.78$

EXAMPLE 5

$f = 39.33 \sim 56.80 \sim 82.00$
$F_{NO} = 4.6 \sim 6.6 \sim 9.5$
$2\omega = 57.6° \sim 41.7° \sim 29.6°$
$f_B = 7.49 \sim 25.18 \sim 50.71$

| | | | | | | | |
|---|---|---|---|---|---|---|---|
| $r_1 =$ | 98.6731 | $d_1 =$ | 8.1577 | $n_{d1} =$ | 1.65446 | $v_{d1} =$ | 33.62 |
| | (Aspheric) | $d_2 =$ | 11.9490 | $n_{d2} =$ | 1.52542 | $v_{d2} =$ | 64.55 |
| $r_2 =$ | 22.4632 | $d_3 =$ | 1.0000 | | | | |
| $r_3 =$ | −16.6693 | $d_4 =$ | (Variable) | | | | |
| | (Aspheric) | $d_5 =$ | 2.9377 | $n_{d3} =$ | 1.54869 | $v_{d3} =$ | 45.55 |
| $r_4 =$ | ∞ (Stop) | $d_6 =$ | 4.8461 | | | | |
| $r_5 =$ | −61.0458 | $d_7 =$ | 1.5000 | $n_{d4} =$ | 1.51633 | $v_{d4} =$ | 64.15 |
| | (Aspheric) | | | | | | |
| $r_6 =$ | −28.5374 | | | | | | |
| | (Aspheric) | | | | | | |
| $r_7 =$ | −11.1475 | | | | | | |
| $r_8 =$ | −157.8762 | | | | | | |

Zooming Spaces

| f | 39.33 | 56.80 | 82.00 |
|---|---|---|---|
| d | 15.726 | 7.642 | 2.048 |

Aspherical Coefficients

1st surface $P = -10.9084$
$A_4 = -0.41878 \times 10^{-4}$
$A_6 = 0.51815 \times 10^{-7}$
$A_8 = -0.31952 \times 10^{-8}$
$A_{10} = 0.19161 \times 10^{-10}$ 3ed surface $P = 1.0000$
$A_4 = -0.89434 \times 10^{-5}$
$A_6 = 0.17428 \times 10^{-5}$
$A_8 = -0.91947 \times 10^{-7}$
$A_{10} = 0.18648 \times 10^{-8}$ 5th surface $P = -3.0045$
$A_4 = 0.38524 \times 10^{-4}$
$A_6 = 0.18702 \times 10^{-5}$
$A_8 = -0.36648 \times 10^{-7}$
$A_{10} = 0.16297 \times 10^{-9}$ 6th surface $P = 1.0000$
$A_4 = -0.17517 \times 10^{-5}$
$A_6 = 0.11940 \times 10^{-5}$
$A_8 = -0.19220 \times 10^{-7}$
$A_{10} = 0.12961 \times 10^{-10}$
(1) $v_P - v_N = 30.93$
(2) $d_{12} F_{NO}/f_0 = 2.33$ FIGS. 4A to 8L graphically show spherical aberration, astigmatism, distortion and lateral chromatic aberration at the wide end (A–D), the standard position (E–H), and the tele end (I–L) in Examples 1 to 5.

As will be clear from the foregoing description, the two-unit zoom lens system of the present invention makes it possible to realize a reduction in size, a lowering in cost and an improvement in performance with a minimal number of lens elements. In addition, assembleability can be improved to a considerable extent by forming the 1-st lens unit from a single cemented lens.

What we claim is:

1. A variable focal length lens system comprising, in order from an object side thereof:

a first lens unit having positive power, said first lens unit being closest to the object side in said variable focal length lens system, and said first lens unit including:
      a cemented doublet comprising a negative lens and a positive lens, said cemented doublet being closest to the object side in said first lens unit, said cemented doublet having at least one aspherical lens surface, and said cemented doublet being concave on an object side, and
   a second lens unit having negative power; wherein
   a focal length of said variable focal length lens system being varied by changing a spacing between said first lens unit and said second lens unit; and
   said variable focal length lens system satisfying the following condition for any focal length position of said variable focal length lens system:

$$0.8 < d_{12} F_{NO}/f_0 < 3.0 \qquad (2)$$

where $d_{12}$ is thickness of said cemented doublet in said first lens unit, $f_0$ is a focal length of said variable focal length lens system, and $F_{NO}$ is an F-number of said variable focal length lens system at said focal length $f_0$.

2. A variable focal length lens system comprising, in order from an object side thereof:

a first lens unit having positive power, said first lens unit being closest to the object side in said variable focal length lens system and including a cemented doublet, said cemented doublet being closest to the object side in said first lens unit and comprising:
      a negative lens,
      a positive lens, and
      an aspherical surface on an object side surface; and
   a second lens unit having negative power;
   a focal length of said variable focal length lens system being varied by changing a spacing between said first lens unit and said second lens unit; and
   said variable focal length lens system satisfying the following condition at any focal length position of said variable focal length lens system:

$$0.8 < d_{12} F_{NO}/f_0 < 3.0$$

where $d_{12}$ is a thickness of said cemented doublet in said first lens unit, $f_0$ is a focal length of said variable focal length lens system, and $F_{NO}$ is an F-number of said variable focal length lens system at said focal length $f_0$.

3. A variable focal length lens system according to claim 1 or 2, wherein said variable focal length lens system satisfies the following condition:

$$v_P - v_N > 15 \qquad (1)$$

where $v_N$ is an Abbe's number of said negative lens in said first lens unit, and $v_P$ is an Abbe's number of said positive lens in said first lens unit.

4. A variable focal length lens system according to claim 1 or 2, wherein:

said negative lens in said first lens unit is disposed on an object side of said first lens unit; and
   said positive lens in said first lens unit is disposed on an image side of said first lens unit.

5. A variable focal length lens system according to claim 1 or 2, wherein:

said cemented doublet in said first lens unit has a convex surface directed toward an image side of said variable focal length lens system.

6. A variable focal length lens system according to claim 1 or 2, wherein:

said at least one aspherical lens surface provided on said cemented doublet in said first lens unit is shaped so that one of a positive refractive power thereof becomes weaker and a negative refractive power thereof becomes stronger as a distance from an optical axis of said variable focal length lens system increases toward a periphery of said aspherical lens surface.

7. A variable focal length lens system according to claim 1 or 2, wherein:

said second lens unit includes an aspherical surface.

8. A variable focal length lens system comprising, in order from an object side thereof:

a first lens unit consisting of a cemented doublet having positive power, said cemented doublet being concave on a object side surface said first lens unit being closest to the object side in said variable focal length lens system; and
   a second lens unit including a negative meniscus lens having a convex surface directed toward an image side of said variable focal length lens system;
   a focal length of said variable focal length lens system being varied by changing a spacing between said first lens unit and said second lens unit; and
   said first lens unit being adjacent to said second lens unit with an air separation located therebetween and without a lens interposed therebetween.

9. A variable focal length lens system comprising, in order from an object side thereof:

a first lens unit consisting of a cemented doublet having positive power, said cemented doublet being of meniscus shape having a convex surface directed toward an image side of said variable focal length lens system, said first lens unit being closest to the object side in said variable focal length lens system; and
   a second lens unit including a negative single lens;
   a focal length of said variable focal length lens system being varied by changing a spacing between said first lens unit and said second lens unit; and
   said first lens unit being adjacent to said second lens unit with an air separation located therebetween without a lens incorporated therebetween.

10. A variable focal length lens system consisting of, in order from an object side thereof:

a first lens unit consisting of a cemented lens having positive power; and a second lens unit including a negative single lens;

a focal length of said variable focal length lens system being varied by changing a spacing between said first lens unit and said second lens unit.

11. A variable focal length lens system consisting of, in order from an object side thereof:

a first lens unit consisting of a cemented lens having positive power; and a second lens unit having negative power and including a positive lens and a negative lens;

a focal length of said variable focal length lens system being varied by changing a spacing between said first lens unit and said second lens unit.

12. A variable focal length lens system comprising, in order from an object side thereof:

a first lens unit consisting of a cemented doublet having positive power, said first lens unit being closest to the object side in said variable focal length lens system; and a second lens unit having negative power and including:

a positive lens, and a negative meniscus lens having a convex surface directed toward an image side of said variable focal length lens system, with an air separation between said positive lens and said negative meniscus lens;

a focal length of said variable focal length lens system being varied by changing a spacing between said first lens unit and said second lens unit, said first lens unit being adjacent to said second lens unit with an air separation located therebetween without a lens incorporated therebetween.

13. A variable focal length lens system according to claim 12, wherein:

said cemented doublet is concave on an object side surface.

14. A variable focal length lens system according to claim 12, wherein:

said cemented doublet is convex on an image side surface.

* * * * *